(12) United States Patent
Egawa et al.

(10) Patent No.: US 10,040,380 B2
(45) Date of Patent: Aug. 7, 2018

(54) SEAT COVER FOR VEHICLE SEAT

(71) Applicant: TOYOTA BOSHOKU KABUSHIKI KAISHA, Aichi-ken (JP)

(72) Inventors: Kosei Egawa, Aichi-ken (JP); Yasushi Noguchi, Aichi-ken (JP); Sakino Abe, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 14 days.

(21) Appl. No.: 15/278,613

(22) Filed: Sep. 28, 2016

(65) Prior Publication Data
US 2017/0096089 A1 Apr. 6, 2017

(30) Foreign Application Priority Data

Oct. 2, 2015 (JP) .................................. 2015-196743

(51) Int. Cl.
*B60N 2/58* (2006.01)
(52) U.S. Cl.
CPC .................................. *B60N 2/5883* (2013.01)
(58) Field of Classification Search
CPC .............................. B60N 2/5883; B60N 2/609
See application file for complete search history.

(56) References Cited

U.S. PATENT DOCUMENTS

| | | | | |
|---|---|---|---|---|
| 3,696,771 A * | 10/1972 | Ambrose | ............. | B60N 2/5883 112/417 |
| 5,885,679 A * | 3/1999 | Yasue | .................... | A41D 27/24 156/73.4 |
| 6,997,126 B2 * | 2/2006 | Murley | .................... | B60N 2/58 112/470.27 |
| 7,117,545 B2 * | 10/2006 | Hannon | ............... | A41D 15/005 2/275 |
| 7,588,814 B2 * | 9/2009 | Olley | .................... | B29C 44/141 428/102 |
| 8,312,826 B2 * | 11/2012 | Lafferty | ............... | B60N 2/5891 112/475.01 |
| 8,714,626 B2 * | 5/2014 | Kornylo | ............... | B60N 2/5883 112/475.18 |
| 8,777,320 B2 * | 7/2014 | Stoll | .................. | B60H 1/00285 297/180.1 |

FOREIGN PATENT DOCUMENTS

JP        2006-117092        5/2006

* cited by examiner

Primary Examiner — Philip F Gabler
(74) Attorney, Agent, or Firm — Greenblum & Bernstein, P.L.C.

(57) ABSTRACT

A seat cover including a reference portion on a design surface of the seat cover, and a linear stitch portion disposed in parallel with the reference portion and including a first stitch portion including a first thread material and a second stitch portion including a second thread material and disposed away from the reference portion than the first stitch portion, wherein the first thread material includes a plurality of seams which intermittently appear on the design surface side, and the second thread material includes a plurality of seams which intermittently appear on the design surface side, and wherein, when viewed in a direction perpendicular to an extending direction of the stitch portion, at least a portion of a seam of one of the first thread material and the second thread material is disposed between adjacent seams of another of the first thread material and the second thread material.

5 Claims, 5 Drawing Sheets

SEAT COVER FOR VEHICLE SEAT

CROSS-REFERENCE TO RELATED APPLICATIONS

This application claims priority from Japanese Patent Application No. 2015-196743 filed on Oct. 2, 2015, the entire contents of which are incorporated herein by reference.

TECHNICAL FIELD

The present disclosure relates to a seat cover of a vehicle seat, which has a pair of stitch portions appearing on a design surface of the seat cover.

BACKGROUND

In this type of vehicle seat, a stitch portion (linear seam) is formed to a seat cover. This stitch portion appears on a design surface of the seat cover, thereby constituting a part of the design of the seat. For example, a seat cover disclosed in JP-A-2006-117092 is formed by sewing a plurality of skin pieces and has a double stitch portion including a pair of stitch portions. In this seat cover, adjacent ends of the skin pieces are turned back inwardly and sewn to each other. Distal end portions of respective skin pieces are folded inward with a sewing place serving as a boundary and are sewn to the corresponding skin piece. A pair of stitch portions is formed by thread materials for sewing the distal ends of respective skin pieces. The pair of stitch portions appears on a design surface of the seat cover. At this time, the pair of stitch portions extends in parallel across the border of the adjacent skin pieces, thereby forming the double stitch portion.

In this type of configuration, a pair of stitch portions is often arranged in parallel at one side of an instith portion. At this time, seams of thread materials constituting one of the stitch portions are intermittently arranged, when viewed in an extending direction of the stitch portions. Similarly, seams of thread materials constituting the other of the stitch portions are arranged side by side in parallel with the seams of the thread materials constituting one of the stitch portions. Here, when viewed in a direction perpendicular to the extending direction of each stitch portion, a place where a pair of seams is arranged in parallel and a place where no seam is arranged are alternately formed on the portion of the seat cover at which the double stitch portion is disposed. The portion of the seat cover at which no seam is arranged is easily deformed and twisted, as compared to the portion of the seat cover which is constrained by the formation of the seams. Therefore, in the configuration of the related art, lateral wrinkles in the direction perpendicular to the extending direction of the double stitch portion occur in the place where the seam of the double stitch portion is not provided. Accordingly, there is a risk that the appearance of the seat cover is deteriorated.

SUMMARY

The present disclosure has been made in view of the above situations and an object to be solved by the present disclosure is to form a pair of stitch portions in better appearance.

According to an aspect of the disclosure, there is provided a seat cover for a vehicle seat, the seat cover including: a reference portion extending in a predetermined direction on a design surface of the seat cover; and a linear stitch portion disposed in parallel with the reference portion, the linear stitch portion including: a first stitch portion including a first thread material; and a second stitch portion including a second thread material and disposed away from the reference portion than the first stitch portion, wherein the first thread material includes a plurality of seams which intermittently appear on the design surface side of the seat cover, and the second thread material includes a plurality of seams which intermittently appear on the design surface side of the seat cover, and wherein, when viewed in a direction perpendicular to an extending direction of the stitch portion, at least a portion of a seam of one of the first thread material and the second thread material is disposed between adjacent seams of another of the first thread material and the second thread material.

Accordingly, a pair of stitch portions (the first stitch portion and the second stitch portion) can be formed in better appearance.

DETAILED DESCRIPTION

Figure 1:
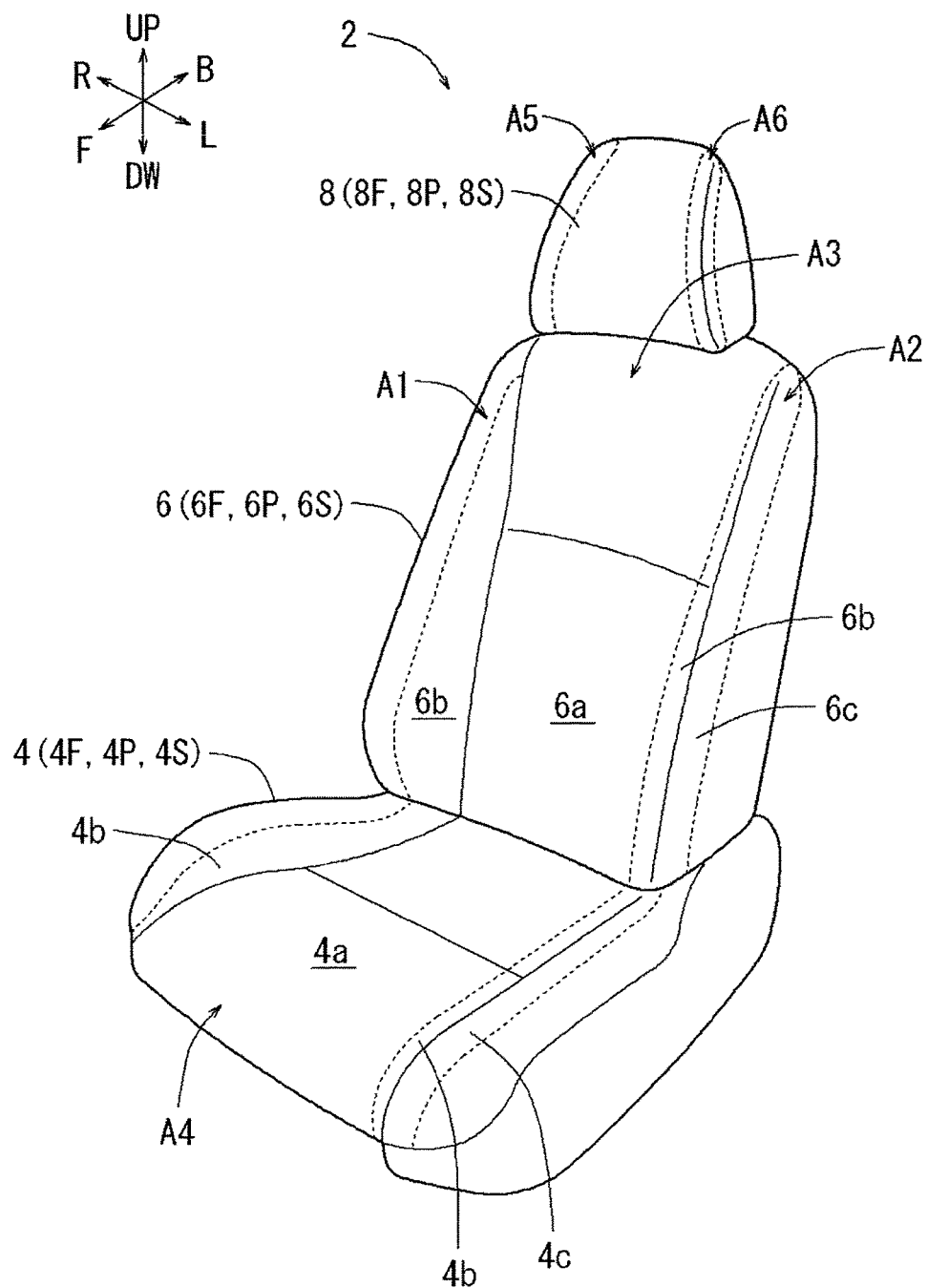
FIG. 1 is a perspective view of a vehicle seat.

Hereinafter, an embodiment for carrying out the present disclosure will be described with reference to FIGS. 1 to 5. In respective drawings, appropriately, the frontward of a vehicle seat is denoted by a symbol "F," the backward of the vehicle seat is denoted by a symbol "B," the upward of the vehicle seat is denoted by a symbol "UP," the downward of the vehicle seat is denoted by a symbol "DW," the rightward of the vehicle seat is denoted by a symbol "R" and the leftward of the vehicle seat is denoted by a symbol "L." A vehicle seat 2 shown in FIG. 1 includes a seat cushion 4, a seat back 6 and a headrest 8. These seat components have a seat frame (4F, 6F, 8F) forming a seat skeleton, a seat pad (4P, 6P, 8P) forming a seat contour and a seat cover (4S, 6S, 8S) covering the seat pad, respectively. In the present embodiment, a lower portion of the seat back 6 is connected to a rear portion of the seat cushion 4 in such a way that the seat back can be raised or lowered. The headrest 8 is disposed on an upper portion of the seat back 6 in an upright state.

Further, the seat back 6 is formed in such a way that the seat pad 6P is placed on the seat frame 6F and covered by the seat cover 6S. Here, the seat frame 6F (not shown) is typically a substantially rectangular or arcuate frame. The seat frame 6F can be formed of a material which is excellent in rigidity, such as metal or rigid resin. Further, the seat pad 6P is a substantially rectangular member forming an outer shape of the seat, as seen in a front view. The seat pad 6P can be formed of a foamed resin such as polyurethane foam (density: 10 kg/m$^3$ to 40 kg/m$^3$). A top plate main portion 6a is formed at the center in a seat width direction of the seat pad 6P. The top plate main portion 6a has a relatively concave shape. Further, a top plate side portion 6b protruding relatively to a seating side and a frame portion 6c forming the side of the seat are respectively formed on the left and right sides of the top plate main portion 6a. Moreover, by referring to FIG. 2, the seat cover 6S (to be described later in detail) is formed by sewing a plurality of skin pieces (e.g., SPa, SPb) (to be described later).

Further, the seat cushion 4 is also formed in such a way that the seat pad 4P is placed on the seat frame 4F and covered by the seat cover 4S. Here, the basic configurations of the seat frame 4F, the seat pad 4P and the seat cover 4S are substantially the same as the corresponding members of the seat back 6. Further, the seat pad 4P is a substantially rectangular member, as seen in a plan view. A top plate main portion 4a, a top plate side portion 4b and a frame portion 4c are formed in the seat pad 4P. Further, the seat cover 4S is also formed by sewing a plurality of skin pieces (reference numeral is not shown). Moreover, the headrest 8 can be also formed in such a way that the seat pad 8P is placed on the seat frame 8F and covered by the seat cover 8S. Further, the seat cover 8S is formed by sewing a plurality of skin pieces (reference numeral is not shown).

[Seat Cover]

By referring to FIG. 1, each of the seat covers 4S, 6S, 8S described above is a surface material respectively constituting a design surface of the seat and can be divided into first members A1, A2, A5, A6 where lateral wrinkles are relatively likely to occur and second members A3, A4 where lateral wrinkles are less likely to occur than the first members. The first members A1, A2, A5, A6 are disposed to be curved in a seat width direction, a seat longitudinal direction or a seat up-down direction. The first members A1, A2, A5, A6 are portions of the seat cover where a force in a bending direction is likely to be applied and thus lateral wrinkles are likely to occur. As an example, the first members include a right side portion A1 and a left side portion A2 in the seat width direction. The portions of the seat cover covering the top plate side portions 4b, 6b and the frame portions 4c, 6c are disposed at both side portions A1, A2. Further, similarly, as an example, the first members include a right side portion A5 and a left side portion A6 of the headrest 8. The second members A3, A4 are portions having a degree of curvature smaller than the first members A1, A2, A5, A6 and may be typically set in the portions of the seat cover other than each side portion A1, A2, A5, A6.

In consideration of the design property or the like of the seat, a pair of stitch portions can be formed to at least one of the members A1 to A6 described above. For example, by referring to FIGS. 2 and 3, a double stitch portion 12 including a pair of stitch portions 14, 16 is formed to the first member A2 of the seat back 6. The double stitch portion 12 is disposed along a suturing place of the adjacent skin pieces SPa, SPb. Seams of thread materials Y1, Y2 forming each stitch portion intermittently appear on the design surface of each seat cover 4S, 6S. In this type of configuration, it is desirable to suppress the occurrence of lateral wrinkles at each stitch portion 14, 16 in the first member A2 as much as possible, in consideration of the fact that the first member A2 is a portion where lateral wrinkles are relatively likely to occur. Therefore, in the present embodiment, the pair of stitch portions 14, 16 is formed in better appearance by the configurations to be described below. Hereinafter, as an example, a configuration of the seat cover 6S of the seat back 6 will be described in detail.

[Skin Piece and Instich Portion (Reference Portion)]

Figure 2:
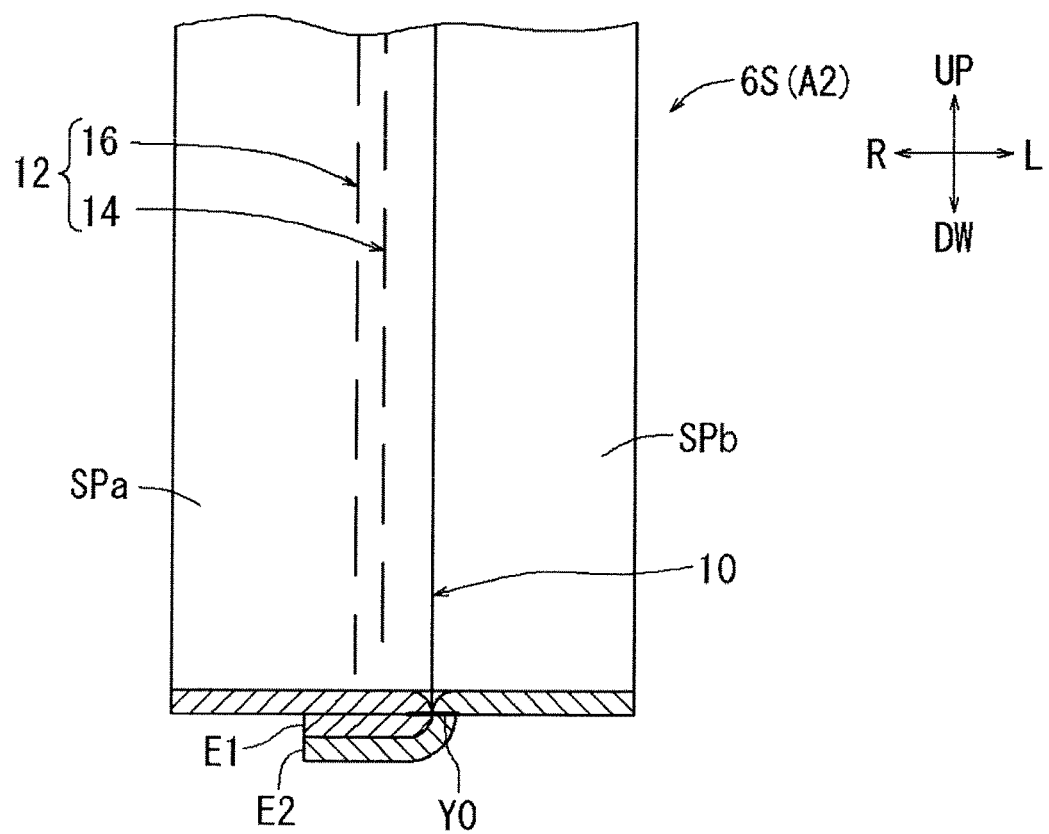
FIG. 2 is a front view of a seat cover, showing a portion in a breakaway view.

By referring to FIG. 2, a side skin piece SPa covering the top plate side portion 6b and a frame skin piece SPb covering the frame portion 6c are disposed at the first member A2 of the seat cover 6S. As an example, the material of each of these skin pieces SPa, SPb may include a fabric (woven fabric, knitted fabric, non-woven fabric) made from natural fibers or synthetic fibers or a leather (natural leather or synthetic leather). Further, in the present embodiment, a left end portion of the side skin piece SPa and a right end portion of the frame skin piece SPb are overlapped to be turned back inwardly. Then, adjacent ends of these skin pieces are sewn. Then, these skin pieces are deployed so as to have a planar shape. At this time, by referring to FIGS. 2 and 3, ends of both skin pieces SPa, SPb are sutured by a thread material Y0. The thread material Y0 forms an instich portion 10 serving as a reference portion. The instich portion 10 that sutures the ends of respective skin pieces SPa, SPb together is linearly disposed along a boundary of both skin pieces SPa, SPb and extends in an up-down direction serving as a predetermined direction. Meanwhile, at the time of covering the seat cover 6S, the seams of the thread material Y0 forming the instich portion 10 are located on the inside of the seat with respect to the boundary of both skin pieces SPa, SPb and are intermittently disposed in the up-down direction. Further, a distal end portion E1 of the side skin piece SPa is folded inwardly with the instich portion 10 serving as a base point and is disposed in a face-to-face form on the rear surface of the side skin piece SPa. Moreover, a distal end portion E2 of the frame skin piece SPb goes beyond the instich portion 10 and is disposed to be overlapped with the distal end portion E1 of the side skin piece SPa.

[Double Stitch Portion (a Pair of Stitch Portions)]

Figure 3:
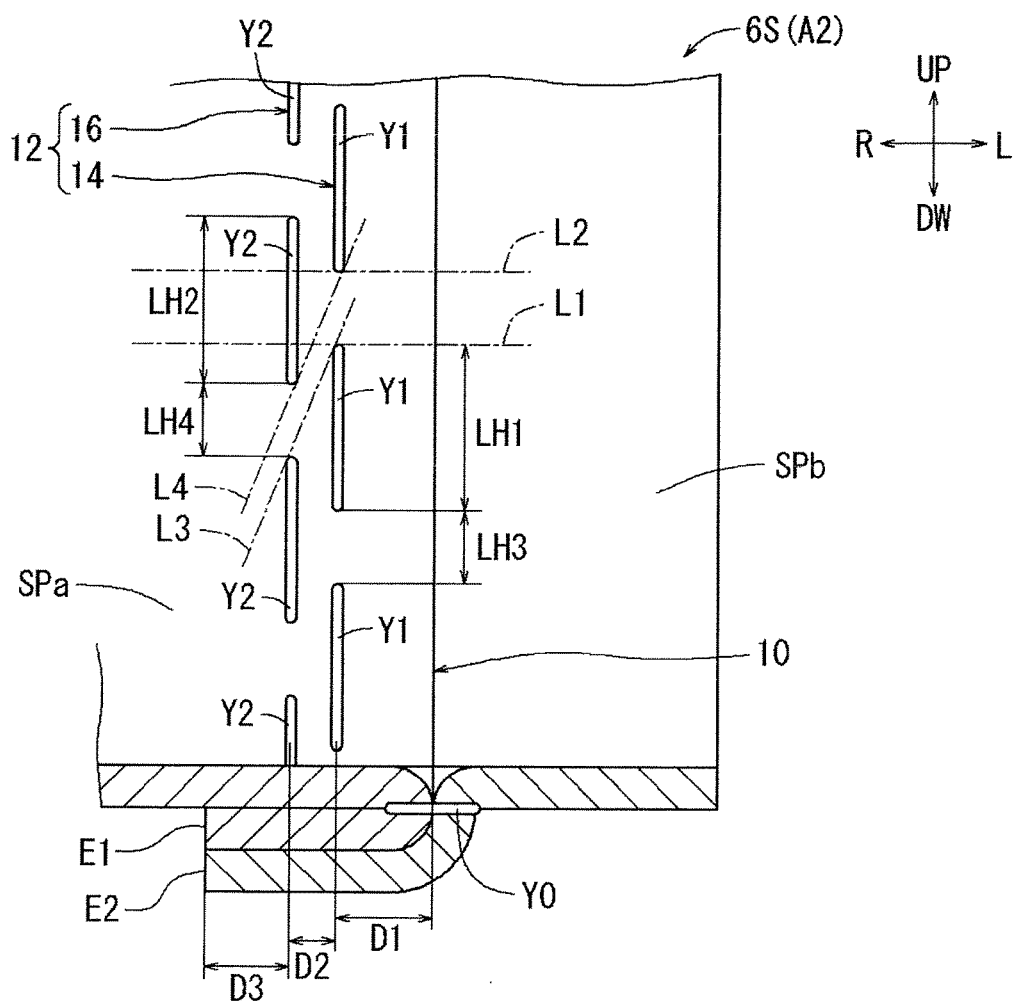
FIG. 3 is an enlarged front view of the seat cover, showing a portion in a breakaway view.
Figure 4:
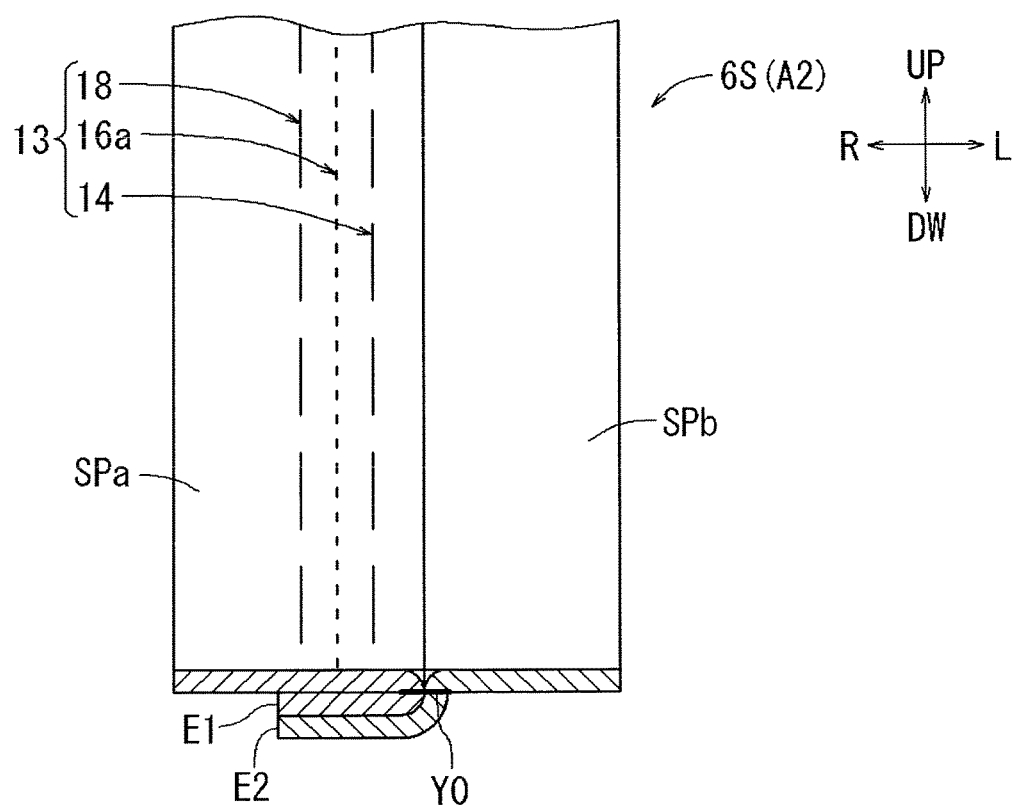
FIG. 4 is a front view of a seat cover according to a first modified embodiment, showing a portion in a breakaway view.

By referring to FIGS. 2 and 3, the double stitch portion 12 is disposed on the right side of the instich portion 10 and includes a pair of stitch portions (the first stitch portion 14 and the second stitch portion 16) extending in parallel with the instich portion 10. Each of these stitch portions 14, 16 is typically formed by a sewing machine (not shown). Further, each of these stitch portions 14, 16 is formed by suitably entangling thread materials Y1, Y2 as an upper thread appearing on the design surface with a lower thread (not shown) disposed on the rear surface through a through-hole (not shown) of the seat cover 6S. The first stitch portion 14 is formed by the first thread material Y1 which sews the distal end portion E1 of the side skin piece SPa and the distal end portion E2 of the frame skin piece SPb to the rear surface of the side skin piece SPa. Further, the second stitch portion 16 is formed by the second thread material Y2 which sews both distal end portions E1, E2 to the rear surface of the side skin piece SPa. The second stitch portion 16 is disposed away from the instich portion 10 than the first stitch portion 14. Thus, in the double stitch portion 12 of the present embodiment, each stitch portion 14, 16 that includes seams formed by each thread material Y1, Y2 is disposed on the right side of the instich portion 10 and intermittently appears on the design surface of the seat cover 6S.

Here, as an example, the material of each thread material Y0, Y1, Y2 may include a thread material made from natural fibers or synthetic fibers. Although the first thread material Y1 and the second thread material Y2 may have the same physical properties, it is desirable that the second thread material Y2 has higher elasticity than the first thread material Y1. For example, in the present embodiment, the second thread material Y2 having higher elasticity and the first thread material Y1 having relatively lower elasticity can be used, from the viewpoint of the improvement in the finishing of the seat cover 6S. Meanwhile, the second thread material Y2 may be configured by a thread material having higher elasticity than the first thread material Y1 or may be configured by a thread material which is the same material as the first thread material Y1 but is thin and easily stretchable. When the seat cover 6S is bent in the seat width direction (e.g., to the right side or left side in the drawing) relative to the instich portion 10, the second thread material Y2 relatively away from the instich portion 10 is required to be greatly stretched. At this time, by using the second thread material Y2 having higher elasticity, the seat cover 6S can be bent in a desired direction without difficulty, thereby improving the finishing of the seat cover 6S. Meanwhile, from the viewpoint of the improvement in the design property, the appearance of the first thread material Y1 and the second thread material Y2 appearing on the design surface may be different from each other. The appearance of each of these thread materials Y11, Y2 may be different from each other by varying the color (hue, brightness and saturation), the thickness or the surface shape (e.g., the presence or absence of fluffing), for example.

Further, although a distance of the double stitch portion 12 from the reference portion is not particularly limited, it is desirable to place the double stitch portion 12 as close as possible to the reference portion. In the present embodiment, the double stitch portion 12 is formed on the left end side of the side skin piece SPa, and thus, is disposed as close as possible to the instich portion 10 serving as the reference portion. At this time, by referring to FIG. 3, a distance between the first stitch portion 14 and the instich portion 10 is denoted by a reference numeral D1, a distance between the first stitch portion 14 and the second stitch portion 16 is denoted by a reference numeral D2, and a distance between the second stitch portion 16 and the distal end portions E1, E2 of each skin piece is denoted by a reference numeral D3. Then, in a case where the distance D3 is set to 6, it is desirable that the distance D1 is set to 2 to 4 (preferably, 3 or more but less than 4) and the distance D2 is set to 2 to 5 (preferably, 3 or more but less than 5). In other words, it is preferable that a ratio D3/D1 is set to 1.5 to 3 (preferably 1.5 to 2) and a ratio D3/D2 is set to 1.2 to 3 (preferably 1.2 to 2). Further, when the seat cover 6S is bent in the seat width direction (e.g., to the right side or left side in the drawing) relative to the instich portion 10, a circumferential length difference occurs between the instich portion 10 and each stitch portion 14, 16. At this time, both stitch portions 14, 16 are placed as close as possible to the instich portion 10, and thus, the circumferential length difference therebetween is reduced. In this way, the seat cover 6S can be bent in a desired direction without difficulty, thereby further improving the finishing of the seat cover 6S.

Then, by referring to FIG. 3, in the present embodiment, the seams of the first thread material Y1 and the second thread material Y2 have a same seam length and intermittently appear at regular intervals on the design surface. Namely, a seam length LH1 of the seams of the first thread material Y1 and a seam length LH2 of the seams of the second thread material Y2 are set to be the same, in an up-down direction in which each stitch portion 14, 16 extends. Further, a seam interval LH3 between adjacent seams of the first thread material Y1 and a seam interval LH4 between adjacent seams of the second thread material Y2 are also set to be the same. These intervals LH3, LH4 are set to be equal to or less than the seam length of each thread material. In this type of configuration, for example, in a case where the seams of the thread materials Y1, Y2 are arranged side by side in parallel in a left-right direction, lateral wrinkles are likely to occur. Namely, these kinds of lateral wrinkles occur along a first imaginary line L1 linearly extending in the left-right direction from an upper end portion of a seam of the first thread material Y1 and a second imaginary line L2 linearly extending in the left-right direction from a lower end portion of another seam of the first thread material Y1 disposed above the seam of the first thread material Y1, for example.

Here, in the present embodiment, from the viewpoint of the improvement in the appearance of the seat cover 6S, the first stitch portion 14 and the second stitch portion 16 are formed to be shifted by a half of the seam length in the up-down direction in which each stitch portion 14, 16 extends. By arranging each stitch portion 14, 16 to be shifted, when viewed in the left-right direction perpendicular to the extending direction of each stitch portion 14, 16, at least a portion of the seam of the second thread material Y2 is disposed between adjacent seams of the first thread material Y1. In this way, the occurrence of the lateral wrinkles is avoided as much as possible. That is, in the present embodiment, a third imaginary line L3 connecting an upper end portion of a seam of the first thread material Y11 and an upper end portion of a seam of the second thread material Y2 disposed on the lower right side of the seam of the first thread material Y1 is arranged to be inclined from the first imaginary line L1. Further, a fourth imaginary line L4 connecting a lower end portion of another seam of the first thread material Y1 and a lower end portion of another seam of the second thread material Y2 disposed on the lower right side of the other seam of the first thread material Y1 is arranged to be inclined from the second imaginary line L2. Thus, since the third imaginary line L3 and the fourth imaginary line LA are inclined in different directions with respect to the original formation direction of the lateral wrinkles, a configuration of desirably suppressing the formation of lateral wrinkles is achieved. Therefore, according to the present embodiment, in the seat cover 6S having the double stitch portion 12 formed thereto, the occurrence of lateral wrinkles in the left-right direction is desirably avoided, thereby achieving a seat structure having good appearance. Meanwhile, in the present embodiment, the first stitch portion 14 and the instich portion 10 may be arranged to be shifted by a predetermined seam length so that lateral wrinkles do not occur therebetween.

As described above, in the present embodiment, the seam of the second thread material Y2 is disposed between adjacent seams of the first thread material Y1, and thus, the formation of lateral wrinkles is suppressed as much as possible. Therefore, it is possible to achieve a structure in which lateral wrinkles in the direction perpendicular to the extending direction of each stitch portion 14, 16 are hardly formed. Especially, in the present embodiment, by using a relatively simple structure in which each stitch portions 14, 16 is arranged to be shifted, lateral wrinkles are hardly formed in the direction perpendicular to the extending direction of each stitch portion 14, 16. Further, in the present embodiment, both the first stitch portion 14 and the second stitch portion 16 are formed on the end side of the side skin piece SPa and are thus arranged as close as possible to the instich portion 10, thereby contributing to the improvement in the finishing of the seat. Therefore, according to the present embodiment, the pair of stitch portions 14, 16 can be formed in better appearance.

First Modified Embodiment

The stitch portion may take various configurations other than the above-described configurations. For example, by referring to FIG. 4, the seat cover 6S of the present modified embodiment includes, as the stitch portion, the first stitch portion 14, a second stitch portion 16a and a third stitch portion 18. Thread materials (reference numeral is not shown) constituting the first stitch portion 14 and the third stitch portion 18 have the same seam length and the seams intermittently appear at regular intervals on the design surface, as seen in the up-down direction in which each stitch portion extends. In this way, by disposing at least a portion of the seam of the thread material of the second stitch portion 16a between adjacent seams of the thread material of the first stitch portion 14, it is possible to achieve a structure in which lateral wrinkles in the direction perpendicular to the extending direction of each stitch portion 14, 16a, 18 are hardly formed.

Second Modified Embodiment

Figure 5:
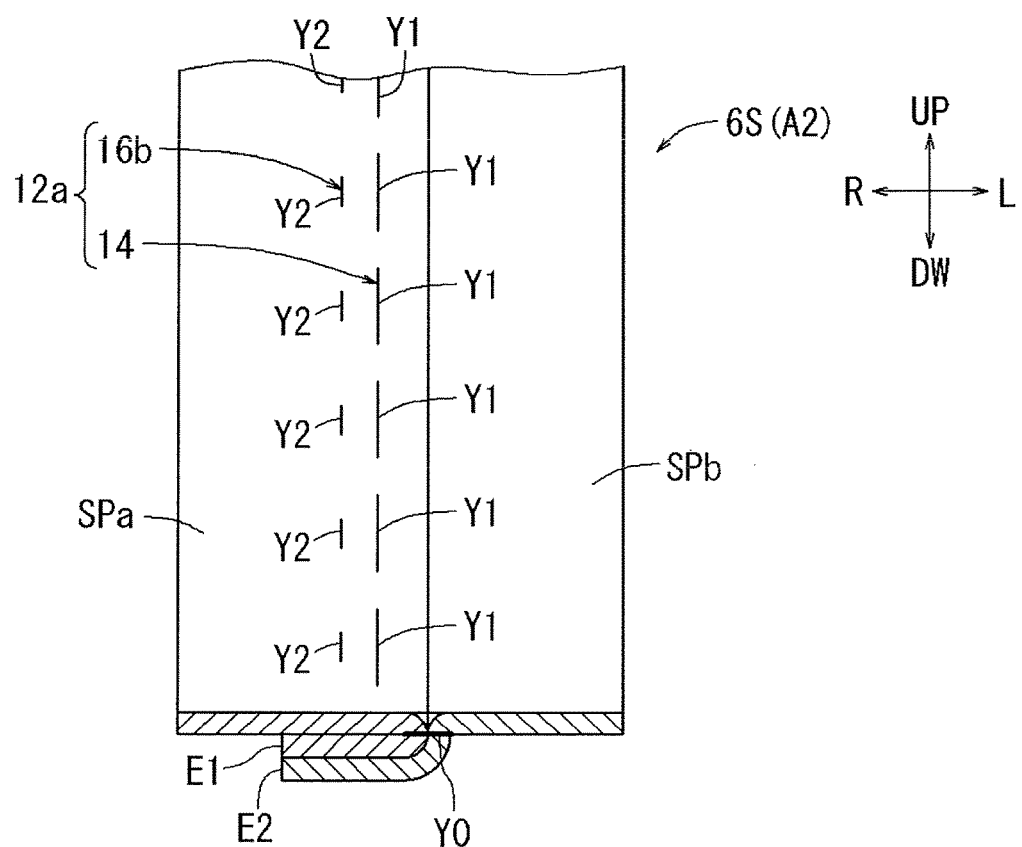
FIG. 5 is a front view of a seat cover according to a second modified embodiment, showing a portion in a breakaway view.

By referring to FIG. 5, in the seat cover 6S of the second modified embodiment, a double stitch portion 12a includes the first stitch portion 14 (having the same configurations as the first stitch portion of the above embodiment) and a second stitch portion 16b. The second thread material Y2 of the second stitch portion 16b has a seam length shorter than a seam length of the first thread material Y1 of the first stitch portion 14, and the seams of the second thread material Y2 intermittently appear on the design surface at seam intervals longer than the seams of the first thread material Y1. Therefore, in the present modified embodiment, when viewed in the left-right direction perpendicular to the extending direction of the double stitch portion 12a, at least a portion of the seam of the first thread material Y1 is disposed between adjacent seams of the second thread material Y2, while the first stitch portion 14 and the second stitch portion 16b are arranged in a face-to-face form. In this way, also in the present modified embodiment, it is possible to achieve a structure in which lateral wrinkles are hardly formed in the direction perpendicular to the extending direction of the double stitch portion 12a.

The vehicle seat of the present disclosure is not limited to the above-described embodiments but may take other various embodiments. For example, in the present embodiment, the configuration of the stitch portions 14, 16 has been described by using the first member A2 as an example. However, the stitch portions may be formed at appropriate places of the first members and the second members. Further, the first members and the second members can be suitably set depending on the configuration of the seat. For example, at least one member of the first members exemplified in the present embodiment may be set as the first member and the other members may be set as the second member. Further, although the double stitch portion and the triple stitch portion have been exemplified as the stitch portion, four or more stitch portions may be formed in parallel.

Further, in the present embodiment, the configuration (shape, dimension, arrangement position, and constitution thread, etc.) of each stitch portion 14, 16 has been exemplified. However, this is not intended to limit the configuration of each stitch portion. For example, in addition to the linear form, each stitch portion may be arranged in a slightly meandering form or may be bent or curved in the middle. Further, the first thread material and the second thread material may have different seam lengths and the seams may be arranged at different seam intervals. Further, the first stitch portion and the second stitch portion may be formed to be shifted by a length less than the half of a seam length or may be formed to be shifted by a length longer than the half of a seam length. That is, the third imaginary line and the fourth imaginary line may be arranged in a relationship inclined with respect to the first imaginary line and the second imaginary line extending in the formation direction of lateral wrinkles. Meanwhile, the third imaginary line and the fourth imaginary line may be formed in a parallel relationship or may be formed in a non-parallel relationship in which these imaginary lines are inclined in another inclination angle. Further, each stitch portion may be disposed on suitable one side (right side, left side, upper side, lower side, front side or rear side) of the instich portion, depending on the formation position. Further, in the second modified embodiment, an example has been described in which the second thread material of the second stitch portion have a relatively short seam length and a relatively long seam interval. In the second modified embodiment, the configuration of the first thread material and the configuration of the second thread material may be reversed. Namely, the first thread material of the first stitch portion may be configured to have a relatively short seam length and a relatively long seam interval.

Further, in the present embodiment, the instich portion 10 has been described as an example of the reference portion. However, this is not intended to limit the configuration (shape, dimension and formation position, etc.) of the reference portion. For example, from the viewpoint of the improvement in the design property, a concave portion or convex portion extending in a predetermined direction may be formed in the seat cover and used as the reference portion. These concave portion and convex portion can be formed by, for example, performing an embossing process or attaching a separate member such as a strip-shaped member to the design surface of the seat cover. Further, the predetermined direction in which the reference portion extends may be set depending on the formation position or shape of the reference portion. Typically, the predetermined direction is a front-rear direction, a left-right direction and an up-down direction of the seat. Further, the reference portion may be suitably formed in a linear form, a curved form and a bent form, depending on the shape of the seat.

Further, in the present embodiment, only the seat back 6 has been described as an example. However, the configuration of the present embodiment is applicable to various seat components such as the seat cushion 4, the headrest 8 or an armrest. Further, the configuration of the present embodiment is applicable to the vehicle seats of general vehicles such as automobiles, airplanes or trains.

What is claimed is:

1. A seat cover for a vehicle seat, the seat cover comprising:
   a reference portion extending in a predetermined direction on a design surface of the seat cover; and
   a linear stitch portion disposed in parallel with the reference portion, the linear stitch portion including:
     a first stitch portion including a first thread material; and
     a second stitch portion including a second thread material and disposed further away from the reference portion than the first stitch portion,
   wherein the first thread material includes a plurality of seams which intermittently appear on the design surface side of the seat cover, and the second thread material includes a plurality of seams which intermittently appear on the design surface side of the seat cover,
   wherein, when viewed in a direction perpendicular to an extending direction of the stitch portion, at least a portion of a seam of one of the first thread material and the second thread material is disposed between adjacent seams of another of the first thread material and the second thread material, and wherein the reference portion includes a linear instich portion that sutures adjacent ends of a pair of skin pieces together.

2. The seat cover for the vehicle seat according to claim 1, wherein the seams of the first thread material and the seams of the second thread material have a same seam length and intermittently appear at regular intervals on the design surface side, and wherein, the first stitch portion and the second stitch portion are arranged to be shifted by a half of the seam length in the extending direction of the stitch portion, and thus, at least a portion of the seam of one of the first thread material and the second thread material is disposed between adjacent seams of the other of the first thread material and the second thread material.

3. The seat cover for the vehicle seat according to claim 1, wherein the seat cover includes a pair of skin pieces adjacent to each other, and wherein both the first stitch portion and the second stitch portion sew distal end portions of each of the pair of skin pieces to the skin piece.

4. The seat cover for the vehicle seat according to claim 3, wherein, in a case where a distance between the reference portion and the first stitch portion is denoted by a reference numeral $D1$, a distance between the first stitch portion and the second stitch portion is denoted by a reference numeral $D2$, and a distance between the second stitch portion and the distal end portions of each of the pair of skin pieces is denoted by a reference numeral $D3$, a ratio $D3/D1$ is set to 1.5 to 3, and a ratio $D3/D2$ is set to 1.2 to 3.

5. The seat cover for the vehicle seat according to claim 1, wherein the second thread material has higher elasticity than the first thread material.

* * * * *